United States Patent [19]

Masuda et al.

[11] 4,420,522

[45] Dec. 13, 1983

[54] PILE FABRIC PRODUCTION METHOD USING POLYURETHANE BINDING AGENT

[75] Inventors: Yutaka Masuda, Otsu; Toshiaki Takai, Ehime; Shunroku Tohyama, Shiga, all of Japan

[73] Assignee: Toray Industries, Inc., Tokyo, Japan

[21] Appl. No.: 449,192

[22] Filed: Dec. 13, 1982

[30] Foreign Application Priority Data

Dec. 15, 1981 [JP] Japan .................................. 56-200905

[51] Int. Cl.³ ................................................ B32B 3/00
[52] U.S. Cl. ........................................ 428/95; 428/90; 428/92; 428/96; 428/97
[58] Field of Search ....................... 428/90, 92, 95, 96, 428/97

[56] References Cited

U.S. PATENT DOCUMENTS 4,363,686 12/1982 Komarek ............................... 428/97

*Primary Examiner*—Marion McCamish
*Attorney, Agent, or Firm*—Wegner & Bretschneider

[57] ABSTRACT

The production of pile fabric, comprising the use of a compound of two or more azilidine groups or two or more blocked isocyanate groups in one molecule, with a polyurethane solution as a binding agent is disclosed. The binding strength of the binding agent is not affected by high-temperature, high-pressure jet-dyeing or the solvent used in dry-cleaning. There is no loss of quality as a result of pile fall-out during such processes.

6 Claims, No Drawings

PILE FABRIC PRODUCTION METHOD USING POLYURETHANE BINDING AGENT

FIELD OF THE INVENTION

This invention concerns the production method of a pile fabric which has excellent fall-out-resistance characteristics. Specifically, the invention seeks to avoid fall-out of the pile, by rendering the bonding of pile fibers resistant to the hot water used in dyeing processes and the solvents used in dry-cleaning processes.

The pile fabrics made according to this invention are suitable for garments, furniture and automobile upholstery, wall coverings, luggage, handbags, purses, shoes, boots and table cloths, for example.

BACKGROUND OF THE INVENTION

Conventionally, various types of bonding agents are used in the methods employed for prevention of pile fiber fall-out in pile fabrics. For example, emulsions of synthetic rubber or acrylic acid esters have been widely used, as electrostatic flocking binders and as binders for the backing of napped fabrics such as tufted fabrics and sliver knitting.

Although such water-based emulsions are easy to use, there are certain problems with their resistance to hot water and solvents. They usually cannot be relied upon during the dyeing process, and, moreover, there are several problems concerning durability as a result of dry-cleaning processes which employ solvents such as perchloroethylene (perchlene) and the like.

In addition, in order to obtain super-fine pile fabrics, the so-called "islands-in-sea" type of composite fiber has been tried as a component in recent years. In such cases, bonding agents are usually used prior to the treatment for making the pile super-fine, and these must of necessity be resistant to the process for removal of the sea component. In other words, the ability to withstand a solvent (such as trichloroethylene or xylene) for the dissolution of the sea component or a chemical (such as alkali) for the decomposition of the sea component, is necessary.

Another requirement is for the bonding agent to resist the hot water and the rubbing actions which are used in the dyeing process.

For example, U.S. Pat. No. 3,865,678 and Canadian Pat. No. 895,611 and others refer to examples of electrostatic flocking of island-in-sea fibers. The binder used in examples such as these must be able to withstand the process for removal of the sea component and the dyeing process (100° C.–130° C.), while maintaining its binding strength.

Experiments conducted by us indicate that there are problems concerning the lack of ability not only of various types of bonding emulsions, but also of solutions of acrylic resins and urethane resins, and the inability to withstand high-temperature (120°–130° C.) dyeing treatments (especially jet-dyeing equipment which employs a strong rubbing action) and solvent treatments such as perchloroethylene, or trichloroethylene and the like. On the other hand, heat curable resins is not practical because of their hardness.

SUMMARY OF THE INVENTION

The objective of this invention is to offer a production method for pile fabrics which employs a binding agent composition that features excellent bonding characteristics with the fiber and that also features softness, resistance to heat and moisture, and resistance to solvents.

This invention is a pile fabric manufacturing method which features binding a pile component, using as a pile bonding agent a combination of (a) a compound which comprises two or more azilidinyl groups or the blocked isocyanate groups in one molecule, and (b) a polyurethane solution as a pile fabric bonding agent, which satisfies the formula below:

$$0.10 \leq (\log P + 1)/C \leq 0.20$$

wherein P is the viscosity of the polyurethane solution in poise and C is polyurethane concentration.

The binding strength of the bonding agent used in this invention shows almost no loss resulting from the moisture and heat which occur in high-pressure dyeing or from the solvents employed in dry-cleaning. Consequently, there is no fall-out of pile, nor does the pile appear to be worn thin by such treatments.

DETAILED DESCRIPTION OF THE INVENTION

This invention is applicable to all kinds of materials and structures of the pile fabric. A flocked product, in which the pile is maintained and secured only by the bonding agent, shows the remarkable effect of this invention. However, this invention is also applicable to products in which pile fibers are bonded by backing, such as other tufted fabrics, sliver knits, various types of piled woven fabrics and pile knits.

Polyesters, polyamides, polyacrylics and other types of synthetic fibers are used in the present invention. Among them polyesters which exhibit many technical problems resulting from high dyeing temperatures and their insufficient adhesive properties, have become remarkably desirable as a result of this invention.

The polyurethane used in this invention is not limited in its structure, but preferably is a polyurethane elastomer obtained from a high-molecular weight diol, a polyisocyanate and chain extender, and, depending upon necessity, a chain terminating agent. Such a polyurethane is soft and has good adhesion to fibers and excellent hydrolysis-resistance properties.

As a high-molecular weight diol component for example, polyetherglycol, polyetheresterglycol, polyesterglycol with molecular weight of 800 to 4000 and polyoxypropylene glycol can be used. As typical products, polytetramethylene oxideglycol, polycaprolactone glycol, polyethylene adipate glycol, and polybutylene adipate glycol can be cited as examples.

As polyisocyanate components, diphenylmethane-4-4'-diisocyanate, dicyclohexylmethane-4-4'-diisocyanate, tolylene diisocyanate isophorone diisocyanate and hexamethylene diisocyanate can be cited as examples Chain extenders include diamine chain extenders such as 4,4'-diaminodiphenylmethane, 4,4'-diaminocyclohexylmethane, tolylene diamine, isophorone diamine, hexamethylene diamine and glycol chain extenders such as ethylene glycol, propylene glycol, 1,4-butane diol, and 1,4-bis($\beta$-hydroxy ethoxy) benzene.

Dimethyl formamide, dimethyl acetamide, dimethyl sulfoxide, diethyl formamide, N-methyl-2-pyrrolidone, dioxane, tetrahydrofuran and o-chlorophenol, etc., or mixtures of these, can be used as polyurethane solvents.

We also discovered that, it is necessary to use together a compound consisting of the above-mentioned polyurethane and a compound having two or more groups of the aziridinyl group or two or more groups of the blocked isocyanate group. This results in a remarkable improvement of moisture/heat-resistance properties and solvent-resistance properties.

For this invention, the compound should have two or more of the azilidinyl groups, of the following formula, in one molecule as the compound.

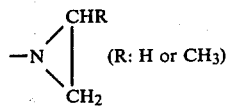
(R: H or CH$_3$)  (1)

The following can be cited as examples of compounds possessing two or more of these groups but the possibilities are not limited to these.

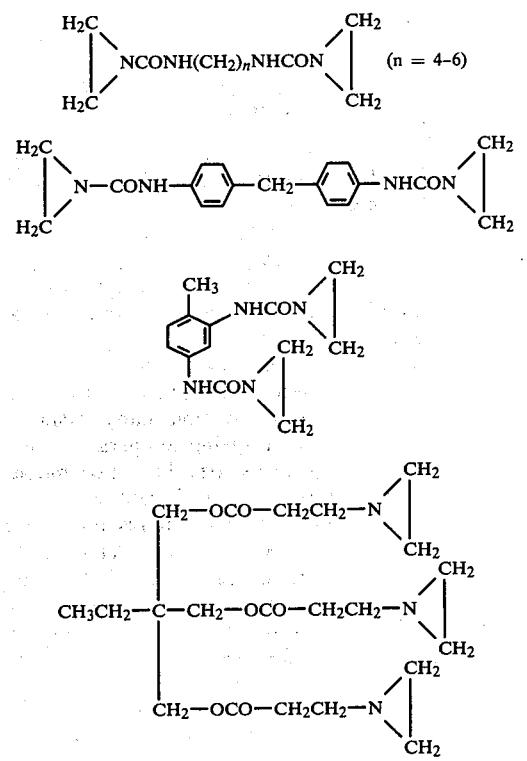

In addition, the various types of ethylenimene carbonylamino compounds, etc. obtained by the reaction of various types of diisocyanate or polyisocyanate compounds with ethylenimene can be cited.

Next, as compounds which have two or more blocked isocyanate groups, the well-known various types of blocked isocyanate compounds which combine blocking agent such as, phenols, alcohols, oximes, lactams or activated methylene compounds, can be cited. In this invention, unblocked isocyanate compounds are not used, because the reaction of the mixture with polyurethane at ambient temperature results in increased viscosity.

Usually, for the compound (a), cross-linking or further chain extending agent, containing either blocked isocyanate compounds or aziridinyl groups, a molecular weight of about 200 to 3000 and a functional group number of 2 to 4 is used. Compounds which have aziridinyl groups have good stability, and in addition, exhibit no disassociated product (blocking agent) in the reaction as with blocked isocyanate compounds, and for that reason are preferably used.

We have determined, with regard to the use of polyurethane together with compounds which have aziridinyl groups or blocked isocyanate groups, that the molecular weight of polyurethane greatly affects the moisture/heat resistance and solvent resistance, and thus that a high molecular weight is preferable. In other words, when the viscosity (25° C.) of the polyurethane solution is expressed as P poise (0.1 kgm$^{-1}$s$^{-1}$), and when the concentration of the solution is expressed as C weight % based on the weight of polyurethane and organic solvent therefor, the following formula (1) should be satisfied.

$$0.10 \leq (\log P + 1)/C \leq 0.20 \quad (1)$$

The average molecular weight of the polyurethane necessary to satisfy the viscosity in formula (1) is about 150,000 to 500,000. If (log P+1)/C is less than 0.10, the moisture/heat resistance and solvent resistance are not sufficient, and, with regard to the pile fabric itself, it is difficult to obtain the desired softness. If, on the other hand, (log P+1)/C is 0.20 or higher, viscosity becomes high, and coating problems easily occur.

The most desirable range is $0.12 \leq (\log P + 1)/C \leq 0.18$. If the pile fabric is electrostatic flocked fabric, the preferred binding property and coating property ranges are C$\leq$35 and 500$\leq$P$\leq$1500, but, for use as a backing, a lower concentration and viscosity can be used.

With regard to the compounds (a) which have functional groups in this invention, 1 to 30% based on the solid polyurethane portion of the polyurethane solution can be used, although a range of 3 to 15%, used together, is preferable. In this instance, when more than necessary is used together, a hard texture results and thus undesirable.

There is no particular necessity to limit the method used for application of the polyurethane and compounds (a) having functional groups; various types of coating, such as ordinary knife coating and roll coating or engraved roll coating can be used to apply the fiber structure.

With regard to the amount of binding agent applied, it differs according to the pile fabric. There is no particular limit, although in flocked processing; it is normally about 30 to 150 g/m$^2$ based on the weight of solid in the binding agent.

The mixture of the polyurethane solution (b) and the compound (a) applied to the fiber structure coagulate and forms a film coating. Either a wet-coagulation method or a dry-coagulation method can be used, but, in view of the adhesive property, the dry-coagulation method is preferable. Coagulation drying is usually at a temperature of 60° to 150° C.

By applying the special binding agent composition of this invention to pile fabrics, it is possible to obtain moisture/heat resistance and solvent resistance which could not formerly be obtained. By using this invention, for example, polyester fibers which are standing pile can be piece-dyed at high temperature (120° to 130° C.); moreover, safe treatment is possible even by using the jet-dyeing method. The pile fabric obtained in this way shows excellent durability properties with regard to washing, dry-cleaning and friction and has super softness characteristics.

EXAMPLES 1 AND 2 AND COMPARATIVE EXAMPLES 1, 2 AND 3

Electrostatic flocking pile (pile surface resistance $3 \times 10^8 \Omega$ cm) was obtained by cutting to 1.5 mm island-in-sea fiber straight tows (5 denier, island ratio 80%, island count 36) consisting of a polystyrene sea component and a polyethylene-terephthalate island component and then immersing this pile in an treatment solution (adjusted to pH 4) consisting of sodium silicate, colloidal silica and an anion-type surfactant and then drying it.

Three types of polyetherurethane DMF solutions with different viscosities and concentrations were prepared by using polytetramethylene glycol ether with a molecular weight of 1500 as the polyol component, diphenylmethane-4-4'-diisocyanate as the diisocyanate component, and 4,4'-diaminodiphenylmethane as the chain extender. To each of these, 4,4'-bisethylene imino carbonyl aminodiphenylmethane was added, as a cross-linking agent, in an amount equivalent to 6% of the urethane solid component, and this mixture was coated, as a binder, in the amount of 300 g/m² to T⁶⁵/R woven fabric (weight 150 g/m²). To this, the pile described previously was electrostatically flocked by the down method under a voltage of 30,000 V, thus forming the three types of flocked product for examples 1 and 2 and comparison example 1. Note that, as a comparison, flocked products were formed (comparison examples 2 and 3) by the same process as for examples 1 and 2, except that the cross-linking agent used in examples 1 and 2 was not added. Then these flocked products were dried at 80° C. and then subjected to a heat treatment at 130° C. for five minutes. The amount of flocked pile was in each instance about 120 g/m². Next these flocked products were subjected to three repeated immersions in trichloroethylene at room temperature, and the sea component polystyrene was removed by dissolution. After the sea component was removed in this manner, jet-dyeing equipment was used, using a disperse dye, for dyeing for 60 minutes at 120° C. After reduction cleaning, the super-fine pile flocked product thus obtained was subjected to a friction test when wet with water 100 times as specified by the Flock Test method A-1 (b) of JIS-1084, after which the condition of pile fall-out was judged.

The results are shown in Table 1.

For Examples 1 and 2, there was little pile fall-out during the removal of the sea component and dyeing processes, and the flocked strength was sufficient, as compared to comparison example 1. This had a low polyurethane molecular weight of (log P+1)/C, did not satisfy 0.1, and had a high urethane concentration), which showed insufficient durability, despite the large amount of binding agent after the drying process, and a texture which was quite a bit harder than the examples of this invention. On the other hand, the product in which the cross-linking agent used in comparison examples 2 and 3 was not used showed pile fall-out to the extent that the foundation was exposed under conditions of high temperature, and the flocked strength of the flocked product was low.

TABLE 1

|  |  | Example | | Comparative example | | |
|---|---|---|---|---|---|---|
|  |  | 1 | 2 | 1 | 2 | 3 |
| Poly-urethane | Concentration (%) | 25 | 35 | 45 | 25 | 35 |
|  | Viscosity (poise) | 980 | 900 | 800 | 980 | 900 |
|  | (Log p + 1)/C | 0.16 | 0.13 | 0.087 | 0.16 | 0.11 |
| Cross-linking agent (%) |  | 6 | 6 | 6 | 0 | 0 |
| Removal of sea component |  | A | A | B | B-C | B-C |
| Dyeing |  | A | A | B | B-C | B-C |
| Rubbing test | Water-wet 100 times | A | A | B | B-C | B-C |
|  | Perchlene-wet 100 times | A | A | B | B-C | B-C |
| Texture |  | More resilient than comparative examples 2 & 3, respectively | | Quite hard | Soft | Soft |

Judged results:
A: Little pile fall-out
B: Substantial pile fall-out
  Parts of binder and foundation exposed
C: Much pile fall-out
  Much foundation exposed

EXAMPLE 3 AND 4

Two 25% dimethylformamide solutions (poise 800) of the polyetherester-urethane described in U.S. Pat. No. 3,899,623 (molecular weight 2000 polytetramethyleneglycol ether 75% and polyethylene adipate glycol polyester 25%, as the high-molecule diol component; diphenylmethane-4-4'-diisocyanate, as the diisocyanate component; 4,4'-diaminodiphenylmethane, as the chain extender) were prepared. With these were mixed, as the cross-linking agent, an aziridine compound (60% methyethylketone solution of 3-functional azilidine compound containing 7.8% aziridinyl group, obtained from ethyleneimine and the reaction product of trimethylolpropane 1 mol and isophorone diisocyanate 3 mol) (Example 3) or a blocked isocyanate compound (55% ethylacetate/methylisobuthylketone solution of blocked polyisocyanate of tolylenediisocyantate series containing 7.0% isocyanate group) (Example 4) respectively, so that each become 8 solid% based on the weight of solid polyurethane. Electrostatic flockings were conducted in the same manner as example 1, using these mixtures, as the binders, then removed the sea component by dissolution, and dyed (Note that the temperature used for heat treatment of the blocked isocyanate and materials used with it was, having regard to the disassociation temperature of blocking agents, 150° C. for 5 minutes).

There was little pile fall-out during each process, and the flocked strength of flocked products is good, with no visible exposure of the foundation binder after subjection to the rubbing test under water-wettings 100 times or under perchloroethylene-wettings 100 times.

EXAMPLE 5

Island-in-the-sea fiber (3.8 denier, island ratio 80%, island count 6, island denier 0.5) consisting of nylon 6 island component and, as the sea component, a 7 mol% isophthalic acid sodium sulfonate copolymerized polyethyleneterephthalate component of an alkali soluble type was cut to a length of 1 mm, after which it was immersed in a treatment solution consisting of sodium silicate, colloidal silica and potassium chloride, then desiccated and dried, thus obtaining pile for electrostatic flocking.

A polyurethane made from polytetramethyleneglycol ether (molecular weight 2000) 60% and polycaprolactoneglycol (molecular weight 2000) 40%, as the polyol component, diphenylmethane-4-4'-diisocyanate, as the diisocyanate component, and 4,4'-diaminodiphenylmethane, as a chain extender were dissolved in a dimethylformamide to give a solution (30%, 1200 poise), and, dissolved in the solution 2,2-bishydroxymethyl butanol-tris-(3-(1-aziridinyl)propionate) of formula (5), as cross-linking agent, in a quantity of 3% based on the solid polyurethane. This binding agent was used to coat the surface of polyester spun fabric (weight 80 g/m$^2$) in the amount of 350 g/m$^2$, and to this the previously described island-in-sea fiber pile was flocked.

After drying at 80° C., it was subjected to a heat treatment at 135° C. for 5 minutes. It was then immersed in a 2.5% NaOH water solution at 80° C. for one hour, and, after removing the sea component polyester by dissolution, the nylon fabric was dyed in the usual way at 98° C. by acid dye.

There was very little pile fall-out during these processes. The dyed product was washed in water three times in a washing machine, dry-cleaned three times, after which three was almost no pile fall-out noted, and the product quality was judged good. On the other hand, when the test was conducted in the same manner but without using the cross-linking agent, there was generally much pile fall-out during the processes, there was some sparseness of flock density partially visible, and the dry-cleaning test exposed a part of the foundation.

EXAMPLE 6

Island-in-sea type crimped staple (3.5 denier×32 mm, island ratio 80%, island count 16) consisting of polyethylene-terephthalate island component and polystyrene sea component was fed to a single-ridge roller card, producing 16 g/m sliver which was fed to a sliver knitting machine, producing a pile knitted fabric (acryl spun yarn ground: no. 20 count double yarn, weight 800 g/m$^2$). To the reverse side of the knitted fabric was applied a backing of polyether-urethane (the same as used in Example 1 diluted 20%). The same treatment was also used, as a comparison, without using the cross-linking agent. After the front pile length was cut to 5 mm by using a shearing machine, the sea component was dissolved in trichloroethylene, and jet-dyeing equipment was used for dyeing.

The pile-knitted fabric of this invention showed little pile fall-out during processes or as a finished product, but the comparison example showed "bald" spots in places, and the finished product showed much pile fall-out.

What is claimed is:

1. A method for pile fabric production comprising the binding of a pile component, using as a pile binding agent a combination comprising:
    (a) a compound which contains two or more azilidine groups or two or more blocked isocyanate groups in one molecule, and
    (b) a polyurethane binding agent solution which satisfies the formula $$0.10 \leq (\log P + 1)/C \leq 0.2$$

wherein, P is the viscosity in poise of polyurethane solution and C is the concentration of polyurethane.

2. The method of claim 1, wherein the pile fabric is a flocked fabric.

3. The method of claim 1, wherein the solvent of the polyurethane binding agent solution is N,N'-dimethyl acetamide, dimethyl sulfoxide or N-dimethyl acetamide.

4. The method of claim 1, wherein the compounds containing two or more groups in one molecule are used in a range of 1 to 30% based on polyurethane the weight of the solid portion of the polyurethane binding agent solution.

5. The method of claim 1, wherein the pile component is a super-fine fiber of 1 denier or less.

6. The pile fabric which is prepared by binding a pile component, using as a pile binding agent a combination comprising:
    (a) a compound which contains two or more aziridine groups or two or more blocked isocyanate groups in one molecule, and
    (b) a polyurethane binding agent solution which satisfies the formula $$0.10 \leq (\log P + 1) \leq 0.2$$

wherein P is the viscosity in poise of polyurethane solution and C is the concentration of polyurethane.

* * * * *